United States Patent Office 3,792,166
Patented Feb. 12, 1974

3,792,166
METHOD OF USING SUBSTITUTED IMIDAZO
[2,1-b]THIAZOLES AS ANTHELMINTIC AGENTS
Larry Dean Spicer, Princeton, and John James Hand,
Trenton, N.J., assignors to American Cyanamid Company, Stamford, Conn.
No Drawing. Continuation-in-part of application Ser. No. 90,141, Nov. 16, 1970, now Patent No. 3,708,490, which is a continuation-in-part of abandoned application Ser. No. 3,220, Jan. 15, 1970. This application Mar. 13, 1972, Ser. No. 234,323
Int. Cl. A61k 27/00
U.S. Cl. 424—270    9 Claims

ABSTRACT OF THE DISCLOSURE

The preparation of acyl substituted phenylimidazo[2,1-b]thiazoles found useful for the control of helminths in warm-blooded animals, is described.

This application is a continuation-in-part of application Ser. No. 90,141, filed Nov. 16, 1970, now U.S. Pat. 3,708,490 which is a continuation-in-part of application Ser. No. 3,220, filed Jan. 15, 1970, now abandoned.

DESCRIPTION OF THE INVENTION

The present invention relates to novel compounds of the formula:

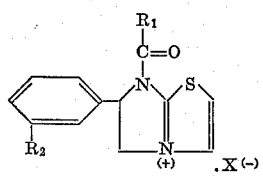

where $R_1$ is hydrogen, alkyl having 1 to 17 carbon atoms, haloalkyl having 1 to 6 carbon atoms, lower alkoxy having 1 to 4 carbon atoms, lower carboalkoxy loweralkyl, phenyl, halophenyl and lower alkylphenyl in which lower alkyl has 1 to 4 carbon atoms; $R_2$ is hydrogen, nitro, halo, trifluoromethyl, formylamino or lower alkanoyl ($C_1$-$C_4$) amino and X is a pharmaceutically acceptable anion and the optically active isomers thereof.

This invention also relates to a novel process for the preparation of the above compounds and to the use of such compounds for the control of helminths in warm-blooded animals.

Synthesis of 7-carboxylicacyl-6-phenyl-6,7-dihydro-5H-imidazo[2,1-b]thiazolium (I) salts having the formula:

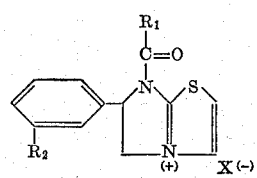

where $R_1$ is hydrogen, alkyl ($C_1$-$C_{17}$), haloalkyl ($C_1$-$C_6$), loweralkoxy ($C_1$-$C_4$), lower carbalkoxyloweralkyl, phenyl, halophenyl (preferably chlorophenyl or bromophenyl) or lower alkylphenyl (preferably methyl or ethyl phenyl); $R_2$ is hydrogen, nitro, halogen (preferably chloro or bromo), trifluoromethyl, formylamino or lower alkanoyl ($C_1$-$C_4$) amino and X is a pharmaceutically acceptable anion (preferably chlorine or bromine); can be prepared by either of the processes A or B graphically illustrated below.

Process A

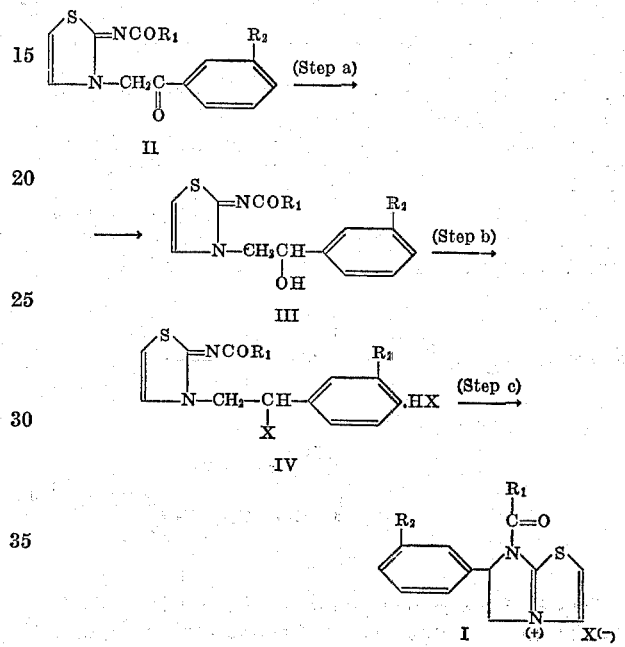

Process B

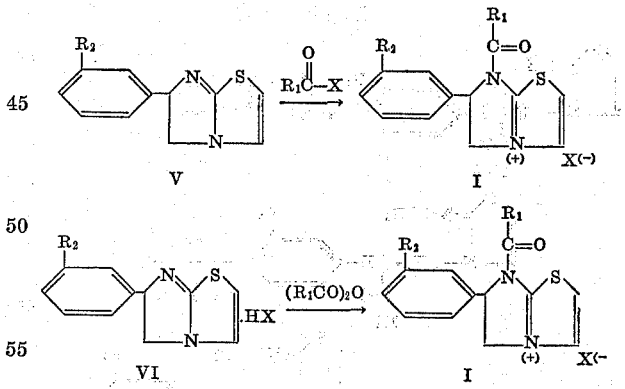

wherein $R_1$, $R_2$, and X are as hereinbefore defined.

With respect to Process A, it should be noted that compounds of Type (II) (i.e., the starting materials) are disclosed by B. Kickhofen and Frohnke, in Ber., 88, 1109 (1955) and A. H. M. Raeymaekers, F. T. N. Allenijn, J. Vanderberk et al. J. Med. Chem., 9, 545 (1966) and are generally prepared by the following reaction sequence.

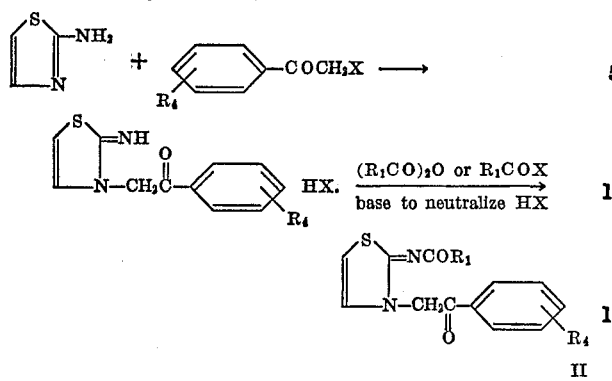

In the cited references X is halogen, preferably chlorine or bromine; $R_4$ is alkyl, nitro, halogen or the like and $R_1$ is methyl.

We have now found that $R_1$ may also be hydrogen, alkyl, haloalkyl, lower alkoxy, halophenyl, phenyl or lower alkylphenyl.

The reduction of the aryl ketone (II) to the alcohol (III) (Step a) has also been reported by Raeymaekers et al. for a variety of compounds. Raeymaekers utilizes NaBH$_4$ (sodium borohydride) as the reducing agent, however, we have found that lithium borohydride and potassium borohydride may also be used.

We have found that compounds illustrated by III are very conveniently prepared by selective acylation of the imino group in compounds of Formula II-A with an acyl anhydride wherein $R_1$ and $R_2$ are as defined above. This process is novel and is a new route to compounds illustrated by Formula III. It may be illustrated as follows:

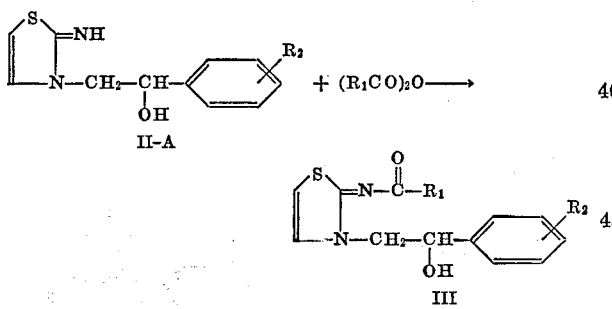

Step b of the present process carried out by methods similar to those disclosed by Raeymaekers et al., and yields key intermediate Compounds IV.

Step b

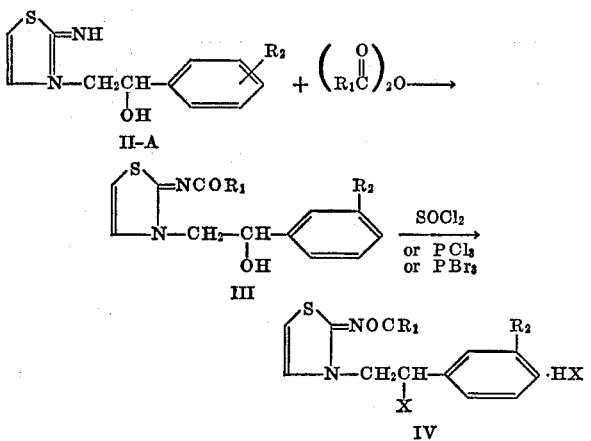

We have found in agreement with Raeymaekers et al. that by the reaction of Formula III compounds with thionyl chloride (SOCl$_2$), phosphorus trichloride or phosphorus tribromide, in an inert solvent, Formula IV compounds may be obtained.

Step c

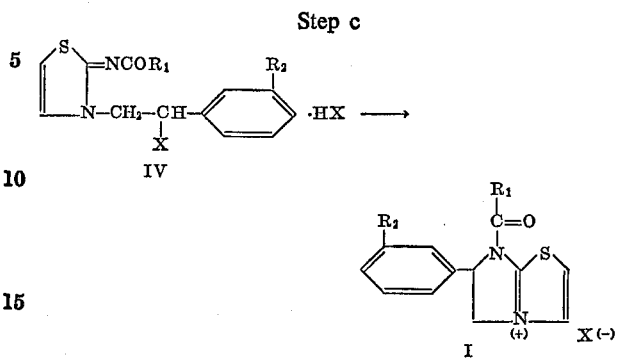

wherein $R_1$, $R_2$ and X are as hereinbefore defined. Ring closure of Formula (IV) compounds to yield Formula (I) compounds in which $R_1$ and $R_2$ are as described above may be accomplished by: (1) treatment of Formula (IV) compounds with the appropriate anhydride at a temperature of about between 50–200° C., and preferably 90–120° C. (2) isomerization of the free base of (IV) in an inert solvent (e.g., tetrahydrofuran or chloroform). The free base is made by neutralization of the HX salt (e.g., basic ion exchange resin, sodium bicarbonate or carbonate solution, or one mole of a trialkylamine). Isomerization is usually carried out at a temperature between 30° C. and 100° C. but somewhat higher or lower temperatures may be used, or (3) heating the Formula (IV) compound until it melts.

In Process B, the free base (V) is dissolved in an inert solvent (e.g., ether, tetrahydrofuran, methylene chloride, chloroform, benzene or toluene) and treated with one mole of the carboxylic acyl chloride (or bromide) as follows:

Process B

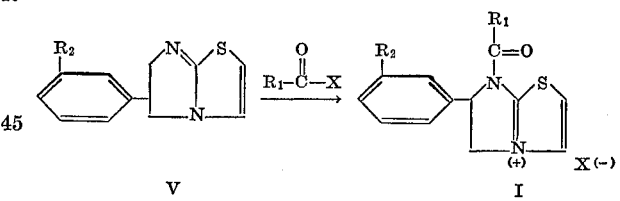

In this reaction, $R_1$ and $R_2$ are as described above. The reaction is generally rapid when conducted at 0° to 30° C. and the upper temperature limit is usually the boiling point of $R_1$COX and solvent. Higher temperatures are not needed. The product (I) where X is chlorine or bromine may be isolated by filtration. Many of these quaternary carboxylic acyl salts (I) readily form solvates and their melting points are dependent on the degree and kind of solvate, as well as rate of heating.

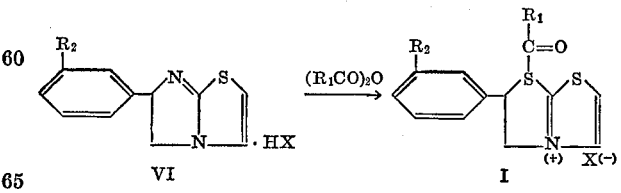

In the above reaction the Formula (I) compounds are synthesized from the Formula (VI) chloride or bromide salt by heating in the appropriate anhydride (R$_1$CO)$_2$O, where $R_1$ is as previously described. This step is usually conducted at a temperature between about 100° C. and 140° C. but may be varied some 10 to 15° C. depending on the reactants employed.

Utilizing Process B above, we have also found that the perchlorate, chloride or bromide salts of the saturated imidazo[2,1-b]thiazolo Formula (VII) may be prepared. These compounds have the structure:

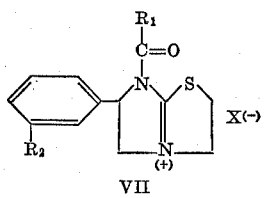

VII wherein $R_1$ and $R_2$ are as described above and X is perchlorate, chloride or bromide. They are, however, markedly less effective as anthelmintic agents than the compounds of the present invention. Moreover, the chloride and bromide salts are generally extremely hygroscopic and degrade rapidly on standing. Among the compounds in this series for which such observations have been made are those of Formula (VII) where $R_2$ is hydrogen and $R_1$ is methyl, phenyl, ethoxy and chloromethyl and those in which the

group is replaced with

or $CH_3SO_2-$.

Among the compounds contemplated by the present invention are, for example;

7-acetyl-6-(m-chlorophenyl)-6,7-dihydro-5H-imidazo [2,1-b]thiazolium chloride;

7-acetyl-6,7-dihydro-6-(m-trifluoromethylphenyl)-5H-imidazo[2,1-b]thiazolium chloride;

7-acetyl-6-(m-formamidophenyl)-6,7-dihydro-5H-imidazo[2,1-b]thiazolium chloride;

6-(m-acetamidophenyl)-7-acetyl-6,7-dihydro-5H-imidazo-[2,1-b]thiazolium chloride;

7-acetyl-6-(m-bromophenyl)-6,7-dihydro-5H-imidazo-[2,1-b]thiazolium chloride;

7-(4-chlorobutyryl)-6,7-dihydro-6-phenyl-5H-imidazo-[2,1-b]thiazolium chloride;

7-(m-chlorobenzoyl)-6,7-dihydro-6-phenyl-5H-imidazo-[2,1-b]thiazolium chloride;

6,7-dihydro-7-(p-nitrobenzoyl)-6-phenyl-5H-imidazo-[2,1-b]thiazolium chloride;

6,7-dihydro-6-phenyl-7-(p-toluoyl)-5H-imidazo[2,1-b] thiazolium chloride;

7-formyl-6,7-dihydro-6-phenyl-5H-imidazo[2,1-b] thiazolium chloride.

In addition to the novel compounds and the processes for the preparation thereof, this invention also includes the use of such compounds for the treatment of helmenthiasis in warm-blooded animals. For such use the novel compounds are generally dispersed in a pharmaceutically acceptable carrier or diluent and administered as a formulated composition. The compositions used may be in the form of a liquid drench, a bolus, capsule, pill, resinate formulation or dissolved in a liquid carrier for administration as an injectable. Boluses, tablets, pills, and the like may be prepared by admixing the active imidazo-[2,1-b]thiazolium salt with binders and lubricants and compressing the mixtures into the desired forms. Usually such preparations contain from about 5% to 20% by weight of the active ingredient. However, this may be varied to allow for variation in size, weight and species being treated. A typical bolus prepared with a compound of the present invention contains approximately 10% by weight of the active ingredient and 90% by weight of diluents such as for example, starch, dicalcium phosphate, cellulose, lactose and dextrose.

Advantageously, injectable formulations may be prepared by dissolving the active ingredient in distilled water, pharmaceutically acceptable alcohols, glycols or the like. Since the compounds of the invention are water soluble, they may be stored as the dry salt and dissolved in water just prior to injection. Stability problems are generally avoided by this practice and shipping costs are measurably reduced.

Where it is desirable to administer the present compounds in admixture with animal feed, we have found that such compounds are generally more acceptable when prepared as resinates utilizing acidic cationic exchange resins and carboxylated cation exchange resins either in hydrogen or alkali metal form. Resins such as the sulfonated polystyrenes prepared from styrene and having 1 to 20 percent by weight of divinyl benzene which functions as a cross-linking agent are among the preferred resins. These include amberlite resins IR-120, IR-112 and Dowex® 50 and 50W.

In practice it is found that the compounds of the invention are effective for controlling a broad spectrum of helminths including Nematodirus, Hoemonchus, Trichostronglyus, Olsophagostomum, Trichuris and Ascaris, which infest animals such as cattle, swine, sheep, dogs, goats, rabbits, guinea pigs and the like.

Usually, effective control is obtained when the compounds are administered at from about 5 to 35 mg./kg. of animal body weight, but higher or lower dose levels may be used as dictated by the size, weight and species of the animal being treated. For example, dose levels as low as 2 mg./kg. of body weight or as high as 100 mg/kg. of body weight may be used depending upon the animal or animals under treatment. This may result in a dosage unit of from about 0.5 mg. to 500 mg.

DETAILED DESCRIPTION

The following examples describe the preparation of representative compounds of this invention and the results obtained in various tests as anthelmintics.

EXAMPLE 1

Preparation of N-(3-phenacyl-4-thiazol-2-ylidene) acetamide

The above compound is prepared according to the procedure described by Kickhofen et al. in 78% yield, melting point 148–152° C. utilizing the appropriate anhydride and phenyl thiazole provides Formula II compounds referred to in the specification above in which $R_1$ and $R_2$ are as described.

EXAMPLE 2

Preparation of N-[3-(β-hydroxyphenethyl)-4-thiazolin-2-ylidene]-acetamide (Process A, Step a)

The above compound is prepared by reacting the compound of Example 1 with sodium borohydride by a slight modification of the procedure of Raeymaekers referred to about in 97% yield, melting point 156–158° C., [lit. melting point 157–159°].

EXAMPLE 3

Preparation of 2,N-[3-(β-hydroxyphenethyl)-4-thiazoline-2-ylidene]acetamide

A solution of 100 g. (0.45 mole) of 2-imino-3-(β-hydroxyphenethyl)thiazoline in one liter dimethyl sulfoxide is treated with 92 g. (0.9 mole) acetic anhydride slowly with stirring. After standing one hour the reaction mixture is diluted with two liters of water and cooled. The precipitated product is recovered by filtration and washed with water. The yield is 109.1 g. (0.42 mole), 96%. Other solvents such as chloroform, methylene chloride, acetic acid, tetrahydrofuran and dimethoxyethane can be used instead of dimethyl sulfoxide.

EXAMPLE 4

Preparation of 2,N-[(3-β-hydroxyphenethyl)-4-thiazoline-2-ylidene]isobutyramide

A solution of 5 g. (0.023 mole) of 2-imino-3-(β-hydroxyphenethyl)thiazoline in 100 ml. dimethyl sulfoxide is mixed slowly with 7.3 g. (0.046 mole) isobutyric anhydride. After 15 minutes the mixture is diluted with water and the product recovered by filtration. The yield is 92.5%.

EXAMPLE 5

Preparation of N-[3-(β-chlorophenethyl)-4-thiazolin-2-ylidene]-hydrochloride acetamide (Process A, Step b)

To a stirred slurry of 26.23 g. (0.10 mole) of the compound of Example 2, N-[3-(β-hydroxyphenethyl)-4-thiazolin-2-ylidene acetamide, in 300 ml. of methylene chloride is added 7.6 ml. (12.47 g.; 0.105 mole) of thionyl chloride dropwise. The addition is attended by a mild exothermic reaction. The reaction mixture is stirred at room temperature for one hour and then at reflux for one hour. The reaction mixture is then cooled and the solid collected by filtration, wt. 25.2 g. (79.5%), melting point 162–165° C., dec. One recrystallization of a 5.0 g. sample gives 2.75 g. of analytically pure product, melting point 164°–166° C., dec.

*Analysis.*—Calcd. for $C_{13}H_{14}N_2SOCl_2$: C, 49.21; H, 4.45; N, 8.83; S, 10.11; Cl, 22.35. Found: C, 49.25; H, 4.51; N, 8.63; S, 10.38; Cl, 22.12.

EXAMPLE 6

Preparation of 7-acetyl-6,7-dihydro-6-phenyl-5H-imidazo[2,1-b]thiazolium chloride (Process A, Step c)

A mixture of 10.0 g. (31.6 mmoles) of the compound of Example 3 and 80 ml. of acetic anhydride is warmed slowly to reflux. Solution is attained ca. 90° C. After refluxing for 2 hours, the solvent is evaporated under reduced pressure. Residual solvent is removed by co-distillation with toluene. The residue is warmed with acetone, cooled and the product collected by filtration. This gives 6.92 g. of white crystals, melting point 198°–201° C. A second crop of 0.51 g. is obtained, melting point 196°–200° C. The mull infrared spectrum of the product obtained by this procedure is different from the product obtained by Method A. However, the NMR is consistent with the expected product and differs only in the water protons when compared with the NMR spectrum obtained in method A.

EXAMPLE 7

Preparation of 7-acetyl-6,7-dihydro-6-phenyl-5H-imidazo-[2,1-b]thiazolium perchlorate (Process A, Step c)

The compound of Example 3, 0.4 g. is placed in a 1.0 cm. diameter test tube and plunged into an oil bath heated to 180° C. After 6 minutes bubbling ceased and the tube is removed from the oil bath. The dark liquid is stirred with acetone and the resulting solid filtered off. This is dissolved in water and treated with sodium perchlorate to give 110 mg. of a light pink solid. The infrared spectrum indicates a high degree of impurity. The acetone filtrate is evaporated to give an oil. This is dissolved in water and and treated with sodium perchlorate to give 90 mg. of pale pink solid, melting point 160°–162° C. and with an infrared spectrum indentical to that of an authentic sample of the perchlorate salt.

EXAMPLE 8

Preparation of 7-acetyl-6,7-dihyro-6-phenyl-5H-imidazo[2,1-b]thiazolium perchlorate (Process A, Step c)

To a slurry of 1.58 (5 mmoles) of the compound of Example 3, in 50 ml. of chloroform there is added 0.51 g. (5.04 mmoles) of triethylamine in 10 ml. of chloroform. The reaction mixture immediately becomes homogeneous. After refluxing for 2 hours, the reaction mixture is cooled and the solvent evaporated to a gum. Acetone is added and the solid removed by filtration. The white solid, 1.22 g., appears to be mixture of ring closed product and triethyl amine hydrochloride. It is dissolved in water, treated with aqueous sodium perchlorate and the precipitate collected by filtration, washed with water and dried. This gives 0.63 g. (2.08 mmoles) 41.5%, melting point 177–179° C. of product. The infrared spectrum is identical to that of the authentic perchlorate salt.

EXAMPLE 9

Preparation of 7-acetyl-6,7-dihydro-6-phenyl-5H-imidazo[2,1-b]thiazolium chloride (Process A, Step c)

To a stirred slurry of 1.58 g. (5.0 mmoles) of the chloro hydrochloride of Example 3 in 50 ml. of chloroform, there is added without drying 5.0 g. of Amberlyst® A–21. ($RCH_2N(CH_3)_2$; 4.7–5.0 meq./g. of dry weight. Porosity 20–30%. Surface area 20–30 meter/g. Moisture, 45%). After stirring for 15 minutes all of the compound is in solution. The resin is filtered off and washed with chloroform. The filtrate is refluxed for two hours, cooled and the solvent evaporated to a gum. This is warmed with acetone and slowly the oily mixture crystallized. The solid is filtered off, washed and dried to give 0.77 g. (51.6%), melting point 95°–100° C. of the chloride salt.

When the ion exchange resin is washed and dried to remove water and the reaction carried out at reflux in the presence of the resin, the yield of product is 41%.

EXAMPLE 10

Preparation of 7-acetyl-6,7-dihydro-6-phenyl-5H-imidazo[2,1-b]thiazolium chloride A quantity of 3.75 g. (15.7 mmoles) of 5,6-dihydro-6-phenylimidazo[2,1-b]thiazole hydrochloride is dissolved in water, cooled with ice and made basic with concentrated ammonium hydroxide. The mixture is extracted with methylene chloride and the combined organic layers washed with water, brine, dried (magnesium sulfate) and evaporated to give 3.03 g. (15.0 mmoles) of an amber oil. The residue is stirred with 400 ml. of ether and filtered. The filtrate is stirred while a solution of 1.26 g. (16.0 mmoles) of acetyl chloride in 50 ml. of dry THF (tetrahydrofuran) is added dropwise. A jelly like precipitate appeared instantly; after the addition is complete the mixture is stirred for 1½ hours, then filtered, and washed with ether to give soft crystals. 3.40 g. of the crystals are recrystallized from acetonitrile to give 2.21 g. of white crystals which melt at 172–175° C.

*Analysis.*—$C_{13}H_{13}SOCl \cdot H_2O$: Calcd.: C, 52.25; H, 5.06; N, 9.38; S, 10.73; Cl, 11.87; O, 10.71. Found: C, 52.60; H, 5.08; N, 9.44; S, 10.90; Cl, 11.93.

EXAMPLE 11

Preparation of 7-acetyl-6,7-dihydro-6-(m-nitrophenyl)-5H-imidazo[2,1-b]thiazolium chloride To 1.55 g. (6.3 mmoles) of the free base, 5,6-dihydro-6-(m-nitrophenyl)imidazo[2,1 - b]thiazole, in dry THF (tetrahydrofuran) is added 0.66 g. (8.4 mmoles) of acetyl chloride in THF. The slurry is stirred 30 minutes, filtered, washed and dried. 1.85 g. of product is obtained and recrystallized from n-propanol to yield the product, melting point 267°–269° C.

*Analysis.*—$C_{13}H_{13}N_3SClO_3$: Calcd.: C, 47.93; H, 3.71; N, 12.90; S, 9.84; Cl, 10.88. Found: C, 47.97; H, 3.66; N, 12.96; S, 9.71; Cl, 10.82.

EXAMPLE 12

Preparation of 7-chloroacetyl-6,7-dihydro-6-phenyl-5H-imidazo[2,1-b]thiazolium chloride A quantity of 3.03 g. (15 mmoles) of the free base 5,6-dihydro-6-phenylimidazo[2,1-b]thiazole, in dry THF (tetrahydrofuran) is treated with 2.03 g. (18 mmoles) of chloroacetyl chloride in THF. A precipitate forms immediately. This is stirred 4 hours then diluted with ether, filtered, washed and dried. 4.55 g. of product is obtained and recrystallized from n-propanol to yield product melting point 194–195.5° C.

Calculated: C, 49.53; H, 3.84; N, 8.89; S, 10.17; Cl, 22.50. Found: C, 49.65; H, 3.90; N, 8.80; S, 9.97; Cl, 22.30.

EXAMPLE 13

Preparation of 6,7-dihydro-6-phenyl-7-propionyl-5H-imidazo[2,1-b]thiazolium chloride To 2.02 g. (10 mmoles) of the free base, 5,6-dihydro-6-phenylimidazo[2,1-b]-thiazole, in dry THF (tetrahydrofuran) is added 1.01 g. (11 mmoles) of propionyl chloride in an ice bath. The ice bath is then removed and the slurry stirred for 1 hour. The slurry is filtered and washed with ether. 2.8 g. of crude product is obtained and recrystallized from acetonitrile, filtered and washed with acetonitrile to give a product with a melting point 198–199° C.

Calculated: C, 57.04; H, 5.13; N, 9.50; S, 10.88; Cl, 12.03. Found: C, 56.80; H, 5.12; N, 9.39; S, 10.60; Cl, 11.88.

EXAMPLE 14

Preparation of 6,7-dihydro-6-phenyl-7-pivoloyl-5-imidazo[2,1-b]thiazolium chloride To 5.6 g. (27.7 mmoles) of the free base 5,6-dihydro-6-phenylimidazo[2,1-b]thiazole in 25 ml. of dry THF (tetrahydrofuran) is added 4.04 g. (30.5 mmoles) of trimethylacetyl chloride in THF. No precipitate is immediately formed. After several minutes a cloudness developed and the mixture is stirred at room temperature for 2 hours. This mixture is diluted with ether and filtered. The crude product is recrystallized from acetonitrile to yield product having melting point 178–182° C.

Calculated: C, 59.53; H, 5.93; N, 8.68; S, 9.93; Cl, 10.98. Found: C, 59.63; H, 5.97; N, 8.73; S, 10.11; Cl, 11.28.

EXAMPLE 15

Preparation of 7-benzoyl-6-phenyl-5H-imidazo[2,1-b]thiazolium chloride

A quantity of 3.57 g. (15 mmoles) of 5,6-dihydro-6-phenylimidazo[2,1-b]thiazolium hydrochloride is dissolved in water. Methylene chloride is added followed by dilute ammonium hydroxide. The organic phase is separated and the aqueous phase extracted again. The organic phase is then washed with water and brine, dried and the solvent evaporated. THF is added and the mixture again evaporated. This leaves the free base as an oil. This is transferred to a flask with 15 ml. of dry THF. While stirring magnetically 2.3 g. (16.5 mmoles) of benzoyl chloride in THF is added dropwise. The reaction is very exothermic. THF is added to the mixture, then it is placed in a water bath and stirred 25 minutes. Ice is added to water bath and stirring continued for 15 minutes. The slurry is filtered, washed with ether and dried under nitrogen to give a crude product which is recrystallized from 2 ml. of n-propanol and has a melting point 182–183.5° C.; 0.5 mole n-propanol solvate.

Calculated: C, 62.81; H, 5.14; N, 7.51; S, 8.60; Cl, 9.51. Found: C, 62.35; H, 5.18; N, 7.13; S, 8.22; Cl. 9.30.

EXAMPLE 16

Preparation of 7-cyclohexylcarbonyl-6,7-dihydro-6-phenyl-5H-imidazo[2,1-b]thiazolium chloride A sample of 3.03 g. (15 mmoles) of the free base 5,6-dihydro-6-phenylimidazo[2,1-b]thiazole in THF is treated with 2.4 g. (16.5 mmoles) of cyclohexylcarbonyl chloride. The reaction is exothermic. The mixture is filtered and washed with ether. On recrystallization from dimethyl sulfoxide, the product is recovered having a melting point 218–219.5° C.

EXAMPLE 17

Preparation of 7-hexanoyl-6,7-dihydro-6-phenyl-5H-imidazo[2,1-b]thiazolium chloride A quantity of 2.22 g. (11 mmoles) of the free base 5,6-dihydro-6-phenylimidazo[2,1-b]thiazole, and 25 ml. of THF are mixed, cooled and treated with 2.22 g. (16.5 mmoles) of hexanoyl chloride in THF. The product does not precipitate immediately and there is no noticeable exotherm. The mixture is stirred for 2 hours then filtered and washed with ether. The product is recrystallized from acetonitrile to give a product having a melting point 114–141° C.; monohydrate.

Calculated: C, 57.56; H, 6.53; N, 7.89; S, 9.04; Cl, 9.99. Found: C, 57.82; H, 6.66; N, 7.92; S, 8.98; Cl, 10.18.

EXAMPLE 18

Preparation of 7-(3-carboxypropionyl)-6,7-dihydro-6-phenyl-5H-imidazo[2,1-b]thiazolium chloride methylester To 8.08 g. (40 mmoles) of the free base 5,6-dihydro-6-phenylimidazo[2,1-b]thiazole in 75 ml. of dry THF is added 6.62 g. (44 mmoles) of 3-carbomethoxy propionyl chloride diluted with THF. This is stirred at room temperature for 2 hours, then filtered and dried. The product is recrystallized from 2-propanol yielding a product having a melting point 189.5° C., dec.; 0.25 mole 2-propanol solvate.

Calculated: C, 54.69; H, 5.21; N, 7.62; S, 8.72; Cl, 9.64. Found: C, 55.63; H, 5.30; N, 7.59; S, 8.56; Cl, 9.57.

EXAMPLE 19

Preparation of 7-acetyl-6,7-dihydro-6-phenyl-5H-imidazo[2,1-b]thiazolium perchlorate A mixture of 1.0 g. (416 mmoles) of the salt, 5,6-dihydro-6-phenylimidazo[2,1-b]thiazole hydrochloride and 11 ml. of acetic anhydride is refluxed for 1.5 hours. The solvent is evaporated under reduced pressure to give 1.3 g. of a red-black glass. This is triturated with boiling acetone, cooled and filtered to give 0.61 g. of a light brown solid, melting point 200–204° C. A 0.55 g. sample of the solid is dissolved in water and treated with aqueous sodium perchlorate. This gives 0.56 g. of the perchlorate salt, melting point 175–178° C. The infrared spectrum is identical to that of an authentic sample of the perchlorate salt.

EXAMPLE 20

Following the procedures as described in Examples 4, 7 and 8, but substituting the starting materials with the following compounds:

A. N-[3-(β-chlorophenethyl)-4-thiazolin-2-ylidene]-formamide, hydrochloride

B. N-[3-(β-chlorophenethyl)-4-thiazolin-2-ylidene]-4-chlorobutyramide, hydrochloride C. N-[3-(β-chlorophenethyl)-4-thiazolin-2-ylidene]-m-chlorobenzamide, hydrochloride D. p-nitrobenzamide, N-[3-(β-chlorophenethyl)-4-thiazolin-2-ylidene], hydrochloride
E. p-tolylamide, N-[β-chlorophenethyl)-4-thiazolin-2-ylidene], hydrochloride the following products are obtained:

A'. 7-formyl-6,7-dihydro-6-phenyl-5H-imidazo[2,1-b] thiazolium chloride
B'. 7-(chlorobutyryl)-6,7-dihydro-6-phenyl-5H-imidazo-[2,1-b]thiazolium chloride
C'. 7-(m-chlorobenzoyl)-6,7-dihydro-6-phenyl-5H-imidazo[2,1-b]thiazolium chloride
D'. 7-(p-nitrobenzoyl)-6,7-dihydro-6-phenyl-5H-imidazo-[2,1-b]thiazolium chloride
E'. 7-(p-toluoyl)-6,7-dihydro-6-phenyl-5H-imidazo-[2,1-b]thiazolium chloride

EXAMPLE 21

Preparation of 7-acetyl-6,7-dihydro-6-phenyl-5H-imidazo-[2,1-b]thiazolium chloride (Process A, Step c)

12.5 grams (40.0 mmol.) of N-[3-(β-chlorophenethyl)-4-thiazolin-2-ylidene]hydrochloride acetamide is partitioned between 50 ml. of water and 100 ml. methylene chloride and then saturated aqueous sodium bicarbonate is added until the aqueous phase showed a pH of near 7.0. The methylene chloride is dried over magnesium sulfate and removal of the solvent yields an oil (free base of starting material). The oil is heated at reflux temperature for 30 minutes in 10 ml. of methylene isopropyl ketone (boiling point 95° C.). On cooling, a solid formed in a reaction and 100 ml. of acetone along wtih 10 drops of water is added to the reaction. The product is then filtered and dried to yield 8.0 g. (70% yield). The 7-acetyl derivative is isolated as the monohydrate. The NMR and IR are consistent with the product shown above.

Other 7-acyl compounds are prepared by essentially the same procedure. The 7-acyl compounds are formed when the unring closed compound in its free base form is heated in an inert solvent. The larger acyl groups require higher temperatures so that it is advantageous to employ a solvent like toluene or xylene when the acyl group is isobutyryl and to carry out the reaction at the reflux temperature of the solvent.

EXAMPLE 22

Preparation of 7-isobutyryl-6,7-dihydro-6-phenyl-5H-imidazo[2,1-b]thiazolium 1.54 grams (14.3 mmol.) of isobutyryl chloride in 10 ml. of dry tetrahydrofuran is added in a dropwise fashion to 2.85 g. (14.3 mmol.) of the free base 5,6-dihydro-6-phenylimidazo[2,1-b]thiazole in 10 ml. of the same solvent. The product precipitates almost immediately with a slight warming of the solution. The reaction mixture is stirred an additional 15 minutes and then the product is filtered and dried. Yield: 3.6 g. (83% yield). The product is recrystallized from acetonitrile, melting point 222–223° C.

Analysis.—Calculated for $C_{15}H_{17}N_2OSCl$: C, 58.33; H, 5.54; N, 9.07; S, 10.39; Cl, 11.50. Found: C, 58.16; H, 5.50; N, 8.91; S, 10.40; Cl, 11.57.

EXAMPLE 23

Preparation of 7-stearoyl-6,7-dihydro-6-phenyl-5H-imidazo[2,1-b]thiazolium chloride 3.03 grams (10 mmol.) of stearoyl chloride in 25 ml. ethyl ether is added in a dropwise fashion to 2.02 g. (10 mmol.) of the free base 5,6-dihydro-6-phenylimidazo-[2,1-b]-thiazole in 25 ml. of the same solvent. The product precipitates out as the acid chloride is added. After the addition is completed, the reaction mixture is stirred for an additional 5 minutes and the product is filtered off and dried to yield 5.2 g. of a white solid which is identified as the monohydrate of the desired compound. The salt is recrystallized from acetonitrile and the analytical sample has a melting point 159–162° C.

Analysis.—Calculated for $C_{29}H_{45}N_2SOCl \cdot H_2O$: C, 66.57; H, 9.06; N, 5.35; S, 6.13; Cl, 6.78. Found: C, 66.88; H, 9.47; N, 5.25; S, 6.11; Cl, 6.79.

EXAMPLE 24

Resolution of 5,6-dihydro-6-phenylimidazo[2,1-b]thiazole using dibenzoyl-d-tartaric acid monohydrate 10.0 grams (49 mmol.) of the free base and 18.6 g. (49 mmol.) of dibenzoyl-d-tartaric acid monohydrate ($[\alpha]_D^{25} = -112$ [MeOH]) are dissolved in 50 ml. of hot methanol and then cooled in the refrigerator overnight. On standing overnight, 10.0 g. of the d(+)-6,7-dihydro-6-phenyl-5H-imidazo[2,1-b]thiazole - dibenzoyl - d - tartrate) precipitates from the solution, recrystallized from methanol, melting point 141–143° C.; $[\alpha]_D^{25} = -60.4°$ (C=1.61, $CH_3OH$). The 1-salt (1(−)-6,7-dihydro-6-phenyl - 5H - imidazo[2,1-b]thiazole-dibenzoyl tartrate) crystallizes out of the filtrate after adding 200 ml. acetone; yield 8.0 g., recrystallized from ethanol, melting point 136–138° C.; $[\alpha]_D^{25} = -90.1°$ (C=1.93, $CH_3OH$).

The optically active free bases are obtained from the tartrate salts by treatment with base in the following manner. 6.0 grams (10.7 mmol.) of 1(−)-5,6-dihydro-6-phenyl - 5H - imidazo[2,1-b]thiazole-dibenzoyl - d - tartrate is partitioned between 50 ml. water and 50 ml. methylene chloride. 4M sodium hydroxide is added with stirring until the pH of the aqueous layer is about 10.0. The methylene chloride layer is dried over magnesium sulfate and the solvent removed to yield 1.7 g. of 1(−)-5,6-dihydro-phenylimidazo[2,1-b]thiazole, melting point 42–47° C.; $[\alpha]_D^{25°} = -19.3°$ (C=3.0, $CH_3OH$).

The d(+) - 5,6-dihydro-phenylimidazo[2,1-b]thiazole, melting point 41–43° C.; $[\alpha]_D^{25} = +18.1°$ (C=3.1, $CH_3OH$), is obtained in the same manner as just described.

EXAMPLE 25

Resolution of 5,6-dihydro-6-phenylimidazo[2,1-b] thiazole-1(−)-phenethyl sulfamic acid 5.0 grams (25 mmol.) of the free base and 4.3 g. (25 mmol.) of 1(1−)-phenethyl sulfamic acid are dissolved in 25 ml. of hot acetone. After scratching with a glass rod, white crystals crystallize out of solution, which are then filtered and dried to yield 4.5 g. of the (1-salt) 1(−)-5,6 - dihydro-6-phenyl-5H-imidazo[2,1-b]thiazole 1(−)-phenethyl sulfamate; melting point 159–160° C.; $[\alpha]_D^{25} = -54.4$ (C=3.0, $CH_3OH$). The filtrate is evaporated to yield the (d-salt) d(+)-5,6-dihydro-6-phenyl-imidazo-[2,1-b]thiazole 1(−)-phenethyl sulfamate as an oil; $[\alpha]_D^{25°} = -8.5°$ (C=3.0, $CH_3OH$).

The resolved phenethyl sulfamic acid salts are converted to optically active free bases in the same manner as is previously described for the dibenzoyl-d-tartaric acid salts.

EXAMPLE 26

Preparation of d(+)-7-isobutyryl-6-phenyl-5H-imidazo [2,1-b]thiazolium chloride 1.0 gram (9.5 mmol.) of isobutyryl chloride is added in a dropwise fashion to 1.6 g. of 1(−)-5,6-dihydro-phenylimidazo[2,1-b]thiazole ($[\alpha]_D^{25} = -19.3$) in 20 ml. of dry tetrahydrofuran. The product precipitates almost immediately and after stirring an additional 5–10 minutes 2.4 g. of product is collected. The product is isolated as the monohydrate, $[\alpha]_D^{25°}=+29.3$ (C=2.97, CH₃OH); recrystallized from chloroform, melting point 205–207° C.

*Analysis.*—Calculated for $C_{15}H_{17}N_2SOCl \cdot H_2O$: C, 55.12; H, 5.86; N, 8.57; S, 9.81; Cl, 10.85. Found: C, 55.15; H, 5.36; N, 8.39; S, 9.62; Cl, 11.07.

EXAMPLE 27

Preparation of 1(−)-7-isobutyryl-6-phenyl-5H-imidazo[2,1-b]thiazolium chloride

This compound is prepared in the same way from d(+)-5,6-dihydro - phenylimidazo[2,1-b]thiazole is as d(+)-7-isobutryl-6-phenyl - 5H - imidazo[2,1-b]thiazolium chloride using isobutryl chloride. The chloride salt is isolated as the monohydrate, $[\alpha]_D^{25}=-31.3$ (C=2.54, CH₃OH), recrystallized from chloroform, melting point 208–212° C.

*Analysis.*—Calculated for $C_{15}H_{17}N_2SOCl \cdot H_2O$: C, 55.12; H, 5.86; N, 8.57; S, 9.81; Cl, 10.85. Found: C, 55.26; H, 5.42; N, 8.41; S, 10.02; Cl, 11.15.

The optically active 7-acetyl and other 7-acyl derivatives are prepared in an analogous way by using optically active free base and acetyl chloride, or other acyl chloride.

EXAMPLE 28

Preparation of d(+)-5,6-dihydro-6-phenylimidazo[2,1-b]thiazole p-toluene sulfonate 1.7 grams (8.5 mmol.) of optically active free base ($[\alpha]_D^{25}=+18.1$ [MeOH]) in 50 ml. of ethyl ether is slowly added to 1.6 g. (8.5 mmol.) of p-toluene sulfonic acid monohydrate in 100 ml. of the same solvent. The solid product is filtered, washed with ether and dried to yield 2.7 g. of the desired salt, melting point 124–125° C.; $[\alpha]_D^{25}=+23.5°$ (C=3.15, CH₃OH).

*Analysis.*—Calculated for $C_{18}H_{16}N_2S_2O_3$: C, 57.75; H, 4.81; N, 7.48; S, 17.14. Found: C, 57.85; H, 5.04; N, 7.21; S, 17.24.

EXAMPLE 29

Preparation of 1(−)-5,6-dihydro-6-phenylimidazo[2,1-b]thiazole p-toluene sulfonate 1.8 grams (9.0 mmol.) of optically active free base ($[\alpha]_D^{25}=-19.3°$ [MeOH]) is treated with 1.7 g. (9.0 mmol.) of p-toluene sulfonic acid monohydrate as is previously described for the other optical isomer. The melting point of the salt is 128–129° C.; $[\alpha]_D^{25°}=-22.2°$ (C=3.28, CH₃OH).

*Analysis.*—Calculated for $C_{18}H_{16}N_2S_2O_3$: C, 57.75; H, 4.81; N, 7.48; S, 17.14. Found: C, 57.47; H, 4.81; N, 7.24; S, 17.07.

EXAMPLE 30

Tests showing activity of present compounds against infection with *Nematospiroides dubius*

In the following tests Swiss-Webster female white mice are infected with *Nematospiroides dubius* and held for three weeks to permit the infestations to mature.

After the holding period, mice are randomly selected and inoculated subcutaneously with an aqueous solution of test compound. Distilled water is used as the diluent for said solution. Sufficient compound is dissolved to permit injection of from 15 to 60 mg./kg. of body weight of test compound.

Four to five days after treatment the mice are necropsied and the number of adult worms counted and recorded. Twenty untreated mice are used as controls and these have 20 to 25 adult worms. Data obtained are reported in Table I below as percent reduction of adult worms.

TABLE I

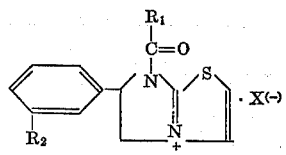

| | | | Subcutaneous activity vs. *N. dubius* | | |
|---|---|---|---|---|---|
| R₁ | R₂ | X | Number of mice | Dose, mg./kg. | Percent reduction of adult worms |
| CH₃ | H | Cl | 23 | 60 | 89 |
| | | | 20 | 40 | 67 |
| | | | 29 | 30 | 56 |
| ClCH₂ | H | Cl | 4 | 60 | 99 |
| | | | 8 | 30 | 42 |
| (CH₃)₃—C— | H | Cl | 8 | 60 | 94 |
| | | | 8 | 30 | 75 |
| | | | 4 | 15 | 34 |
| C₆H₅ | H | Cl | 4 | 60 | 95 |
| C₆H₁₁ | H | Cl | 4 | 30 | 23 |
| | | | 4 | 60 | 53 |
| | | | 4 | 30 | 29 |
| CH₃(CH₂)₄— | H | Cl | 4 | ¹60 | 74 |
| | | | 4 | ¹30 | 70 |
| CH₃OCOCH₂CH₂— | H | Cl | 4 | 60 | 94 |
| | | | 4 | 30 | 39 |
| CH₃ | NO₂— | Cl | 4 | 60 | 100 |
| | C₆H₅ | | 4 | 30 | 24 |

¹ 50% DMSO.

NOTE.—All compounds tested without adjustment for salt. All dissolved in sterile water. DMSO=Dimethylsulfoxide.

EXAMPLE 31

Test of present compounds in sheep

Animals.—Western lambs are inoculated with Clostridium Type D bacterin and treated with an anthelmintic (8–10 mg./kg., 1-tetramisol, 1–TMS) to remove existing worm burdens.

One month later, they are infected with 1200 *Ostertagia circumcinta* (originally obtained from the University of California, Davis, Calif.), 11000 *Trichostrangylus axei* (obtained originally from the University of Kentucky); and 9500 *Trichostrongylus colubriformis*. All three species have been maintained in our laboratory for several years. Animals are inoculated by intrarumental injection. They are fed a commercial pelleted sheep ration plus hay and kept on concrete.

Material.—Compounds given by intrarumenal injection are dissolved in 30 cc. water and injected with a 30 cc. disposable syringe using a 17 or 18 ga. 2″ needle.

Compounds given subcutaneously are prepared by dissolving a weighed amount of material in distilled water and adjusting the volume to give either 5, 10 or 20% solutions.

Solutions are injected in the shoulder area. All animals are sacrificed 3 or 4 days after treatment. Both abdnasum and small intestines are removed, examined and processed by routine technique for counting worms.

Untreated controls are sacrificed at the same time and efficacy is determined by the following formula:

Percent efficacy $$= \frac{\text{Average number of worms in controls} - \text{number remaining at necropsy}}{\text{Average number in controls}}$$

Data obtained are given in Table II below:

TABLE II

| Compound | Dose, mg./kg. | Route | Number of sheep | H | T.a. | Oc. | Tc |
|---|---|---|---|---|---|---|---|
| 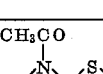 | 6 | S.C. | 2 | 99 | 75 | 79 | 94 |
|  | 8 | S.C. | 4 | 100 | 95 | 90 | 99 |
|  | 8 | I.R. | 2 | 98 | 30 | 48 | 29 |
|  | 10 | S.C. | 2 | 100 | 93 | 98 | 99 |
| 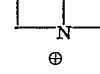 | 8 | S.C. | 2 | 100 | 80 | 97 | 98 |

NOTE.—$H$ = Haemonchus contortus; $A.a.$ = I axei; $O.c.$ = Ostertagia circumcincta; $T.c.$ = $T.$ colubriformis; S.C. = Subcutaneous; I.R. = Intrarumenal; 1-TMS = 1-tetramisole.

EXAMPLE 32

In calves, the injection site studies with 7-acetyl-5,6-dihydro-6-phenyl-5H-imidazo[2,1-b]thiazolium chloride is administered subcutaneously to two calves using a commercial injectable 1-TMS (1-tetramisole) formulation as the control. A total of 10 sites are used on each calf, five on one side received either 8 or 16 mg./kg. (18.2% or 36.4% solutions) dissolved in water of the test compound, and five sites on the opposite side receive 8 mg./kg. of 1-TMS (7.5% solution). Slight tissue reactions are visible when examined at necropsy 26 to 30 days after injecting at one of five and two of five sites in the calves with the test compound and two of five and three of five with the 1-tetramisole injectable.

The reactions which occurred are of such mild nature they might easily have been overlooked. Two of the three reactions with the test compound and two of the five 1-tetramisole reactions occurred in the rump. The tightness of the hide at this location made subcutaneous injection more difficult compared to the other sites and the needles may have scratched or penetrate the muscle since some blanching is visible on slicing into the muscle. Of the three reactions with the test compound, two occur with the concentrated solution (36.4%) at 16 mg./kg. and one with the lesser concentration (18.2%) at 8 mg./kg.

We claim:

1. A method for controlling helminths in warm-blooded animals comprising administering to said animals an anthelmintically effective amount of a compound of the formula:

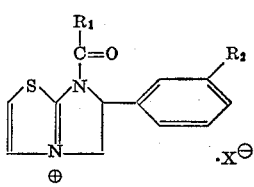

wherein $R_1$ is hydrogen, alkyl ($C_1$–$C_{17}$), mono-haloalkyl ($C_1$–$C_6$), loweralkoxy ($C_1$–$C_4$), 2-carbomethoxyethyl, phenyl, mono-halophenyl, lower alkyl ($C_1$–$C_4$) phenyl; $R_2$ is hydrogen, nitro, halogen, trifluoromethyl, formylamino or alkanoyl ($C_1$–$C_4$) amino and X is a pharmaceutically acceptable anion and the optically active isomers thereof.

2. A method according to claim 1, wherein $R_1$ is methyl, $R_2$ is hydrogen and X is chlorine.

3. A method according to claim 1, wherein $R_1$ is methoxycarbonylethyl, $R_2$ is hydrogen and X is chlorine.

4. A method according to claim 1 wherein $R_1$ is methyl, $R_2$ is nitro and X is chlorine.

5. A method according to claim 1 wherein $R_1$ is phenyl, $R_2$ is hydrogen and X is chlorine.

6. A method according to claim 1 wherein $R_1$ is tertiary-butyl, $R_2$ is hydrogen and X is chlorine.

7. A method according to claim 1 wherein $R_1$ is chloromethyl, $R_2$ is hydrogen and X is chlorine.

8. A method according to claim 1 wherein $R_1$ is cyclohexyl, $R_2$ is hydrogen and X is chlorine.

9. A method according to claim 1 wherein $R_1$ is pentyl, $R_2$ is hydrogen and X is chlorine.

References Cited

UNITED STATES PATENTS 3,642,809   2/1972   Bullock _____ 424—270

SAM ROSEN, Primary Examiner